April 24, 1934.  A. F. SCHWENDNER  1,956,255
GOVERNOR
Filed Sept. 10, 1929
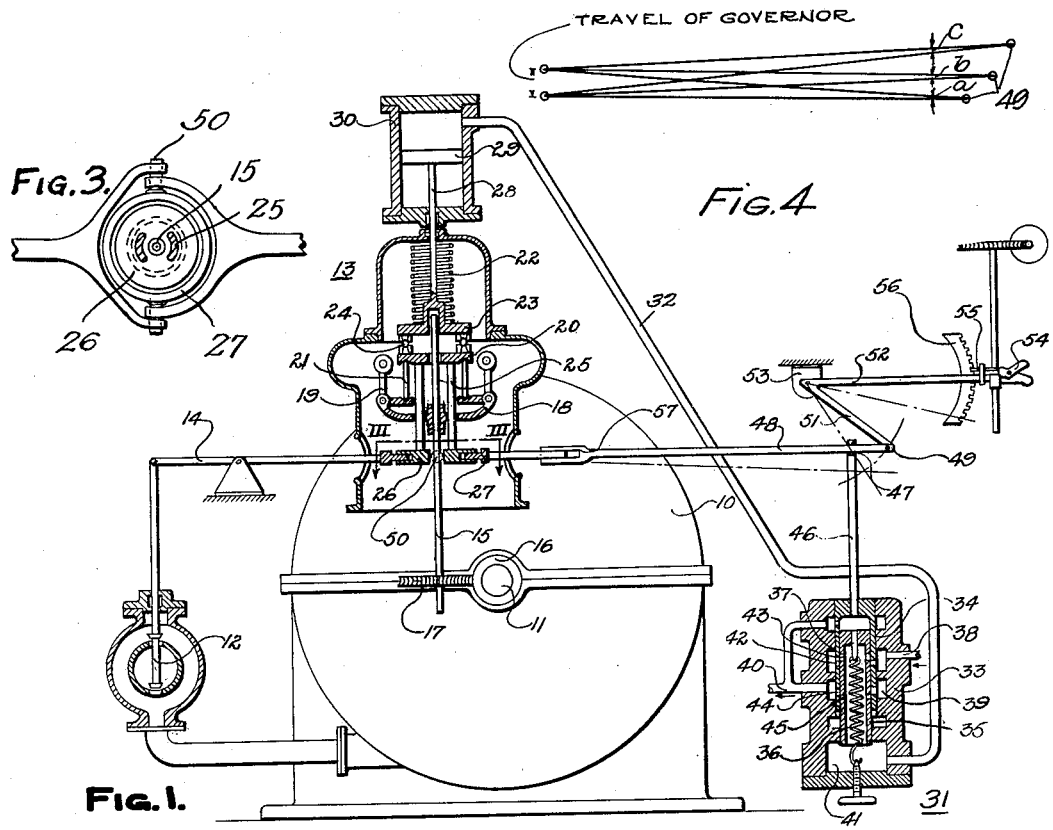
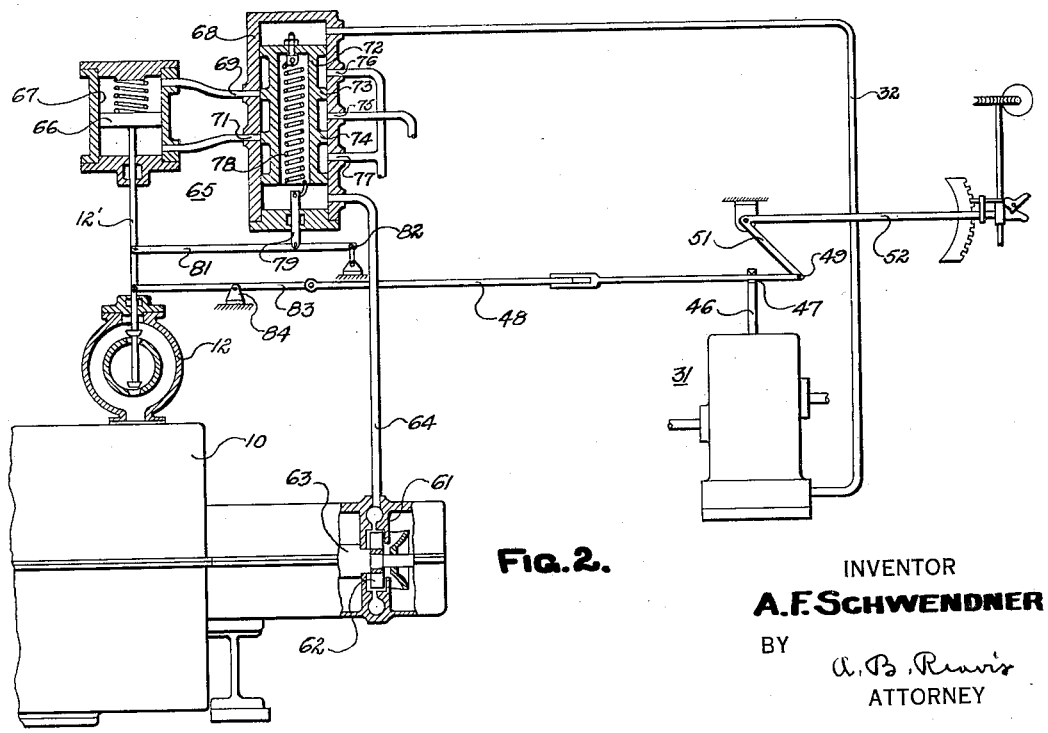
INVENTOR
A. F. SCHWENDNER
BY
A. B. Reavis
ATTORNEY Patented Apr. 24, 1934

1,956,255

UNITED STATES PATENT OFFICE 1,956,255

GOVERNOR

Anthony F. Schwendner, Essington, Pa., assignor to Westinghouse Electric & Manufacturing Company, a corporation of Pennsylvania Application September 10, 1929, Serial No. 391,529

14 Claims. (Cl. 264—7)

My invention relates to a speed governor, particularly for a prime mover, and it has for its object to provide a speed governor which will govern the prime mover over a wide range of speeds.

A more specific object of my invention is to provide a speed governor of the character designated, which will govern within the same percentage of regulation at whatever speed it may be set.

Satisfactory governing devices have been developed for governing prime movers at a given speed. Considerable difficulty has been experienced, however, in designing governors for varying speeds. This difficulty is due to the fact that the variations in governing force are much greater at higher speeds than at lower speeds, whereas the spring which opposes the governing force is capable of providing but one scale, which may be suitable for one speed but unsuitable for other speeds.

In accordance with my invention, I provide a governing force varying as a function of the speed of the prime mover and a spring-biased element responsive to said force for controlling the prime mover. I further provide means for modifying the action of the element to provide substantially the same governing action for a given percentage of variation from the speed at which the governing mechanism is set to operate. This means is preferably a means for applying to the element a fluid pressure which varies upon movement of some part of the governing mechanism which moves upon change in speed, and it may also include provision for changing this fluid pressure to effect change in speed setting.

These and other objects are effected by my invention, as will be apparent from the following description and claims taken in connection with the accompanying drawing, forming a part of this application, in which:

Fig. 1 is a diagrammatic view of my invention, certain parts thereof being shown in elevation and other parts in section;

Fig. 2 is a similar view of my invention applied to a fluid pressure governor;

Fig. 3 is a detail plan view, partly in section, taken on the line III—III of Fig. 1; and Fig. 4 is a diagram illustrating the limits of movement of the lever shown in Figs. 1 and 2 at 48.

Referring now to the drawing more in detail, I show, in Fig. 1, a prime mover 10, which may be a steam turbine, having a rotating shaft 11 and an admission valve 12. The valve 12 is controlled by a governor 13 in any suitable manner. For the sake of simplicity, I show a lever 14 connecting the valve 12 direct to the governor 13; although any suitable power-actuating mechanism may be interposed, as is well understood in the art.

The governor 13, which is shown in this embodiment as of the well-known fly-ball type, has a shaft 15 driven by the turbine shaft 11 through a worm 16 and a worm gear 17. The shaft 15 carries a disc 18 upon which the weight arms 19 are pivoted. The weight arms bias a collar 20, through knife edges 21, with a force which varies as the square of the speed of the prime mover. The upward bias on the collar 20 is opposed by a spring 22, which transmits its force through a flange 23 and ball bearings 24. The resultant movement of the collar 20 is transmitted through bolts 25 to a rotating collar 26, which in turn, controls a non-rotating collar 27, to which the lever 14 is pivoted as indicated at 50.

The apparatus so far described provides a governor of the fly-ball type, the operation of which is well known and will be readily apparent. As the speed of the prime mover increases, the centrifugal force of the weights carried by the arms 19 increases. The arms 19 move the collar 20 upwardly to an extent determined by the scale of the spring 22. The upward movement of the collar 20 is transmitted through bolts 25 to the collars 26 and 27, the collar 27 moving the valve 12, through the lever 14, to decrease the fluid admission to the prime mover.

Upon a decrease in speed, the reverse operation takes place, the decrease in centrifugal governing force permitting the spring 22 to effect an increased opening of the valve 12.

This governor may be designed to provide satisfactory operation at any one given speed, which, in the present embodiment of my invention, is the minimum speed at which the governor may be set, for example, 300 R. P. M.

In order to adapt the governor to govern at increased speeds, I provide fluid pressure to oppose the centrifugal governing force of the governor weights. It will be apparent that such pressure increases the valve opening, and the speed increases until the increased governing force overcomes the fluid pressure and begins to act against the spring 22 until equilibrium is reached.

Let it be assumed that the speed is increased from 300 R. P. M. to 600 R. P. M., by the application of such fluid pressure. The variation in governing force at 600 R. P. M. for a 1% change in speed is about four times the amount of variation for a 1% change at 300 R. P. M. It will thus be apparent that the spring 22 would provide a much greater movement of the governor for a 1% change in speed, resulting in hunting. I, therefore, vary the fluid pressure to off-set a portion of the change in governing force, whereby the spring 22 will receive only sufficient change in force acting against it to effect the desired amount of travel.

The apparatus for providing such variable fluid pressure will now be described.

The flange 23 is connected, through a rod 28, to a piston 29, which operates in a cylinder 30. The upper end of the cylinder 30 communicates with a fluid pressure device 31 through a conduit 32.

The fluid pressure device 31 includes a casing 33 having two telescoped sleeves therein, an outer sleeve 34, and an inner sleeve 35 biased downwardly by a spring 36. The casing 33 has an annular chamber 37 to which fluid pressure is supplied through a conduit 38, a chamber 39 communicating with a drain conduit 40, and a chamber 41 which communicates with the interior of the inner sleeve 35 and with the conduit 32. The upper end of the inner sleeve 35 is closed, so that the fluid pressure in the chamber 41 exerts an upward force thereon which is opposed by the spring 36.

The sleeves 34 and 35 have a normal position relative to each other as shown on the drawing. These sleeves have upper ports 42 and 43, respectively, which are adapted to register and to place the chamber 41 in communication with the pressure chamber 37, when the outer sleeve 34 is moved upwardly relative to the inner sleeve 35. The sleeves are also provided with lower ports 44 and 45, respectively, which are adapted to provide communication between the chamber 41 and the exhaust chamber 39 upon downward movement of the sleeve 34 from normal position relative to the inner sleeve 35.

The operation of the fluid pressure device 31 will be apparent from the following: Upon upward movement of the outer sleeve, the ports 42 and 43 are placed in communication and admit fluid pressure from the chamber 37 to the chamber 41. The pressure in the chamber 41 thereupon increases and the inner sleeve 35 moves upwardly until the increased tension of the spring 36 brings the inner sleeve to normal position, relative to the outer piston 34, whereupon the admission of fluid pressure is cut off. Upon downward movement of the outer sleeve 34 relative to the inner sleeve 35, the ports 44 and 45 place the chamber 41 in communication with the exhaust chamber 39, and permit the escape of fluid from the chamber 41 until the pressure therein drops to such a value that the spring 36 brings the inner sleeve to normal position relative to the outer sleeve, cutting off further escape of fluid pressure from the chamber 41.

It will thus be apparent that the fluid pressure device 31 provides a pressure within the chamber 41 which varies in accordance with the position of the sleeve 34, increasing upon upward movement of said sleeve and decreasing upon downward movement of said sleeve.

The sleeve 34 is provided with an extension 46 having an opening 47 through which a lever 48 extends. The lever 48 is pivoted, at 49, to the arm 51 of a bell crank lever 52, the latter being pivoted to a stationary member at 53. The other arm of the lever 52 has a handle 54 and a detent 55 adapted to engage the ratchets of a quadrant 56.

The lever 48 is an extensible lever, having telescoping portions at 57. The other end of the lever is pivoted to the collar 27, preferably, on the same hinge on which the lever 14 is pivoted. This hinge, which is disposed to the rear of the parts of the collars 26 and 27, seen on the drawing, is indicated by the small dotted circle 50. It is to be noted that the levers 14 and 48 are thus pivoted relative to each other and are not unitary.

The operation of the above-described embodiment is as follows:

To set the governor at the minimum speed, the lever 48 and the bell crank lever 52 are set by the handle 54 in the position shown in dot and dash lines. In this position, the extension 46 of the outer sleeve 34 rests on the lever 48 substantially at the pivot 49. Upon vertical movement of the governor collar 27, therefore, there is substantially no movement of the outer sleeve 34, as indicated by the zero or negligible dimension $a$ in Fig. 4. The device 31 may be adjusted to provide zero pressure in this position of the sleeve 34. Alternatively, the apparatus may be so designed as to provide a fluid pressure, for example, thirty pounds per square inch, which acts on the piston 29 to assist the spring 22, enabling the use of a shorter and more flexible spring 22. The governor now operates at the minimum speed setting in the manner described above.

To increase the speed of the prime mover, the pivot 49 and the bell crank lever 52 are raised by the handle 54, for example, to the position shown in full lines. The effect of this change in the position of the pivot 49 is two-fold: First, the vertical position of the stem is initially raised to increase the fluid pressure on the piston 29, thereby effecting an increased speed setting. Secondly, the stem 46 is spaced from the pivot 49, so that upon movement of the governor, the stem 46 is moved to vary the pressure provided by the pressure device 31. The extent of travel of the stem 46 for the travel of the governor is indicated at $b$ in Fig. 4.

The initial increase in fluid pressure provided by the upward movement of the extension 46 and the outer sleeve 34, acts on the piston 29 in opposition to the governing force, and provides increased opening of the valve 12. The speed of the prime mover, therefore, increases until the governing force comes to an equilibrium with the spring 22 and the fluid pressure acting on the piston 29. This is the action providing the increase in speed setting, for example, to 600 R. P. M.

Assume now, that the prime mover is running at a speed of 600 R. P. M. and that a decrease in the load on the prime mover results in an increase of speed to 606 R. P. M. The increased governing force produced by the increase in speed acts against the spring 22 and the fluid pressure, and results in upward movement of the collar 27 and the lever 48. The lever 48 carries the extension 46 upwardly with it, providing an increase in fluid pressure acting on the piston 29. The increase in fluid pressure offsets a part of the increase in governing force, the remaining portion being taken by the spring 22, and the amount thereof being such that the desired travel for the change in speed is obtained.

It should be noted that the fluid pressure above the piston 29 is controlled by the pressure device 31 and not by the piston 29. Any tendency to inder to raise the piston 66 and fluid in the upper end of the cylinder 67 is discharged through the ports 69 and 76. The upward movement of the piston 66 moves the valve 12 in opening direction, at the same time raising the pilot valve 72 until it returns to cut-off position.

To this governing mechanism, I add the same apparatus which is shown and described in connection with Fig. 1 and having the same reference numerals, for providing fluid pressure to oppose the governing fluid pressure. The opposing fluid pressure is provided by the fluid pressure device 31 and conveyed through the conduit 32 to the upper end of the pilot valve casing 68 and biases the pilot valve 72 downwardly against the force of the governing fluid pressure in the lower end of the casing. In this embodiment, the lever 48 is controlled by the valve stem 12′, which moves upon operation of the governing mechanism in response to change in speed. The lever 48 is pivotally connected to one end of a lever 83, which is fulcrumed at 84 and connected at its other end to the valve stem 12′. The lever 83 provides the proper direction of movement of the lever 48.

The operation of the mechanism providing the opposing fluid pressure is the same as in the embodiment shown in Fig. 1. Upon raising the lever 52, the fluid pressure provided by the device 31 is increased, whereupon an increased opening of the admission valve provides an increased speed at which the pump 61 exerts a fluid pressure to oppose the same. At the same time, the raising of the lever 52 increases the lever arm between the extension 46 and the pivot 49, and, therefore, movements of the valve stem 12′ effect increased changes in the opposing fluid pressure provided by the device 31 to partially offset the increased variations in the fluid pressure developed by the pump 61.

From the above description, it will be apparent that I have provided apparatus which may be added to a well known type of speed governor whereby equally satisfactory governing may be obtained over a wide range of speed.

It will also be noted from the above description that I have provided means for varying the fluid pressure for a given position of the governing element and simultaneously varying the amount of variation in the fluid pressure for a given movement of the governing element. The fluid pressure for a given position of the governing element is varied by vertical movement of the lever 48, and the amount or rate of variation in the fluid pressure for a given movement of the governing element is varied by changing the lever arm between the extension 46 and the pivot 49. In this statement, the collar 20 may be considered as the governing element in Fig. 1, and the valve stem 12′ may be considered as the governing element in Fig. 2.

While I have shown my invention in but two forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. In a speed-responsive governing mechanism for governing a prime mover over a wide range of speeds, the combination of means providing a governing force varying as a function of the speed of the prime mover, an element subjected to and responsive to said variable force, means controlled by said element for governing the prime mover, means for varying the speed setting of the governing mechanism, and means responsive to operation of the governing mechanism upon change in speed for modifying the action of said element in accordance with the speed setting to provide substantially the same governing action for a given percentage of speed variation from the speed at which the governing mechanism is set.

2. In a speed-responsive governing mechanism for a prime mover adapted to operate over a wide range of speeds, the combination of means providing a governing force varying as a function of the speed of the prime mover, an element subjected to and responsive to said governing force, a spring biasing said element, means whereby said element controls the admission of motive fluid to the prime mover, said spring being deflected in accordance with said admission of motive fluid, means for varying the speed setting of the governing mechanism over a wide range of speeds, and means for modifying the action of said element in accordance with the speed setting to provide at all speed settings substantially the same governing action for the same percentage of variation from the speed at which the governing mechanism is set.

3. In a speed-responsive governing mechanism for a prime mover adapted to operate over a wide range of speeds, the combination of means providing fluid pressure varying as the square of the speed of the prime mover, an element subjected to and responsive to said fluid pressure, a spring biasing said element, means whereby said element controls the admission of motive fluid to the prime mover, said spring being deflected by said element as a function of said admission of motive fluid, means for varying the speed setting of the governing mechanism over a wide range of speeds, and means for modifying the action of said element in accordance with the speed setting to provide substantially the same governing action for the same percentage of variation from the speed at which the governing mechanism is set.

4. In a speed-responsive governing mechanism for a prime mover adapted to operate over a wide range of speeds, the combination of means providing a governing force varying as a function of the speed of the prime mover, an element subjected to and responsive to said governing force, a spring acting on said element in opposition to the governing force, means whereby the admission of motive fluid to the prime mover is controlled as a function of the travel of said element, means for varying the speed setting of the governing mechanism over a wide range of speeds, and means for modifying the action of said element in accordance with the speed for which the governing mechanism is set whereby substantially the same travel thereof is obtained at any speed setting for the same percentage of variation from the speed at which the governing mechanism is set.

5. In a speed governor for a prime mover, the combination of means including an element and controlling the admission of motive fluid to the prime mover as a function of the position of said element, means for biasing said element by a governing force varying as a function of the speed of the prime mover, and means for bias-change the pressure by displacement of fluid by the piston 29 is counteracted by the sleeve 34, which operates to admit or discharge fluid to maintain the required pressure, in the manner described above.

For example, if the minimum speed is 300 R. P. M. and the prime mover is now set to run at 600 R. P. M., the fluid pressure may take approximately three fourths of the increase in governing force, so that the spring 22 will receive approximately the same amount of increased force to provide the same amount of travel as an increase from 300 R. P. M. to 303 R. P. M. when the governing mechanism is set at 300 R. P. M. Upon a decrease in speed, it will be apparent that the reverse operation takes place.

To still further increase the speed of the prime mover, the lever 48 and the bell crank lever 52 are further raised, providing a further increase in the fluid pressure in the device 31, and a still greater amount of variation in fluid pressure for a given movement of the governor collar 27, due to the simultaneously increased distance of the extension 46 from the pivot 49. This is illustrated by the dimension c in Fig. 4.

To further illustrate the principles of the invention, let it be supposed that the governing mechanism is to be adapted to speeds from 300 R. P. M. to 900 R. P. M., and that a governing range of 4% above the speed setting is desired to be maintained at any speed setting at which the governing mechanism may be set. Let it be further arbitrarily assumed that the governing force at 300 R. P. M. is 100 lbs., that the spring scale is 4 lbs. per inch, and that the travel of the control element responsive to the governing force is 2 inches.

At speed settings of 300 R. P. M., 600 R. P. M. and 900 R. P. M., therefore, the following values obtain:

| | | | |
|---|---|---|---|
| Max. speed | 312 R. P. M. | 624 R. P. M. | 936 R. P. M. |
| Min. speed | 300 R. P. M. | 600 R. P. M. | 900 R. P. M. |
| Variation in speed | 12 R. P. M. | 24 R. P. M. | 36 R. P. M. |
| Max. gov. force | 108 lbs. | 432 lbs. | 972 lbs. |
| Min. gov. force | 100 lbs. | 400 lbs. | 900 lbs. |
| Variation in gov. force | 8 lbs. | 32 lbs. | 72 lbs. |
| Variation in spring force | 8 lbs. | 8 lbs. | 8 lbs. |
| Variation in fluid pressure | 0 lbs. | 24 lbs. | 64 lbs. |
| Variation in fluid pressure per inch spring deflection | 0 lbs. | 12 lbs. | 32 lbs. |
| Spring force at min. speed | 100 lbs. | 100 lbs. | 100 lbs. |
| Fluid pressure at min. speed | 0 lbs. | 300 lbs. | 800 lbs. |

From the above tabulation, it will be noted that at a speed setting of 600 R. P. M., at which the speed is twice that at 300 R. P. M., the governing force is 400 lbs. or 4 times the governing force at 300 R. P. M., for a given position of the governing mechanism which may be assumed as the minimum speed or full load position. The spring 22, in this position, provides but 100 lbs. force, and the difference, 300 lbs., is provided by the pressure device 31. This increase in fluid pressure from zero to 300 lbs. is effected by the upward movement of the fulcrum point 49, the mechanism for effecting this movement being thus a means for varying the fluid pressure for a given position of the governing mechanism.

The change in governing force between minimum speed or full load position and maximum speed or no load position is 32 lbs., whereas the spring provides a variation of but 8 lbs. between these positions. The difference, 24 lbs., is again provided by variation in fluid pressure provided by the pressure device 31. This is due to the increase of 12 lbs. for each inch of movement of the governor mechanism or deflection of the spring 22, and the amount of this change for an inch of movement is determined by the lever arm between the pivot 49 and the point 47. This amount may be changed by moving the fulcrum 49 longitudinally of the lever, which thereby constitutes a means for changing the amount of variation in fluid pressure for a given movement of the control element.

It will be apparent that the path of movement of the pivot 49 is disposed at such an angle that, upon vertical movement of the pivot 49 to change the speed setting, the accompanying horizontal movement provides the lever arm ratio required to obtain the desired rate of variation in fluid pressure.

In Fig. 2, I show my invention embodied in a fluid pressure governing mechanism, including the same apparatus as shown in Fig. 1 for compensating for the increased variations in governing force at increased speeds.

This governor includes a pump 61, having an impeller 62 mounted directly on the prime mover shaft 63 and providing fluid pressure varying as the square of the prime mover speed. This fluid pressure is conveyed through a conduit 64 to the relay mechanism indicated generally by the numeral 65, which operates the admission valve 12. This relay mechanism includes a piston 66 connected to the valve 12 through a valve stem 12', a cylinder 67 in which the piston 66 operates, a pilot valve casing 68 having ports 69 and 71 communicating with the upper and lower ends, respectively, of the cylinder 67, and a pilot valve 72 in the casing, having piston portions 73 and 74 normally covering the ports 69 and 71. The casing 68 is further provided with a fluid pressure supply port 75 and fluid discharge ports 76 and 77.

The pilot valve 72 is connected to the upper end of a tension spring 78, the lower end of which is connected to a stem 79 extending through the lower end of the casing 68. The stem 79 is pivoted at its lower end to a lever 81 intermediate the ends thereof, said lever having one end pivoted to a fulcrum at 82 and its other end pivoted to the valve stem 12'. The lever 81, the stem 79 and the spring 78 constitute a restoring mechanism for returning the pilot valve 72 to cut-off position when the piston 66 has completed its movement, as is well understood in the art.

The conduit 64 communicates with the lower end of the valve casing 68 and biases the pilot valve 72 upwardly against the force of the spring 78.

The operation of this known form of governor is as follows:

Upon an increase in speed, the fluid pressure developed by the pump 61 increases, effecting an increased deflection of the spring 68 and upward movement of the pilot valve 72. Fluid under pressure then flows through ports 75 and 69 to the upper end of the cylinder 67, and the fluid in the lower end of the cylinder is discharged through the ports 71 and 77. The piston moves the valve 12 downwardly in closing direction, at the same time moving the pilot valve 72 down again to normal cut-off position by means of the lever 81, the stem 79 and the spring 78.

Upon a decrease in speed and fluid pressure, the spring 78 moves the pilot valve 72 downwardly, whereupon fluid under pressure flows through the ports 75 and 71 to the lower end of the cyl- 6. In a speed governor for a prime mover, the combination of means including and controlled by a member for controlling the admission of motive fluid to the prime mover as a function of the position of said member, means for applying a governing force to said member varying as a function of the speed of the prime mover, means for applying to said member a fluid pressure which varies as a function of the position of said member, and means for varying the amount of variation in fluid pressure for a given movement of said member.

7. In a speed governor for a prime mover, the combination of means including and controlled by a member for controlling the admission of motive fluid to the prime mover, means for applying to said member a governing force varying as a function of the speed of the prime mover, means for applying to said member a fluid pressure which varies upon movement of an element of the first-mentioned means, and means for varying said fluid pressure for a given position of said element and simultaneously varying the amount of variation in said fluid pressure for a given movement of said element.

8. In a speed governor for a prime mover, the combination of means including and controlled by a member for controlling the admission of motive fluid to the prime mover, means for applying to said member a governing force varying as a function of the speed of the prime mover, a spring biasing said member in opposition to said governing force, means for applying to said member in opposition to said governing force a fluid pressure which varies upon movement of an element of the first-mentioned means, and means for varying said fluid pressure for a given position of said element and simultaneously varying the amount of variation in said fluid pressure for a given movement of said element.

9. In a speed governor for a prime mover, the combination of means including and controlled by a member for controlling the admission of motive fluid to the prime mover as a function of the position of said member, means for applying to said member a governing force varying as a function of the speed of the prime mover, means for applying to said member a fluid pressure which varies as a function of the position of said member, and means for varying said fluid pressure for a given position of said member.

10. In a speed governor for a prime mover, the combination of means including and controlled by a member for controlling the admission of motive fluid to a prime mover as a function of the position of said member, means for applying to said member a governing force varying as a function of the speed of the prime mover, means for applying to said member a fluid pressure which varies as a function of the position of said member, means for varying said fluid pressure for a given position of said member, and means for varying the amount of variation in said fluid pressure for a given movement of said member.

11. The combination with a governing mechanism for a prime mover including means providing a governing force varying as a function of the speed of the prime mover and a spring-biased element subjected to said variable governing force and controlling the admission of motive fluid to the prime mover, of a lever connected to a part of the governing mechanism whose position is a function of the motive fluid admission, a device controlled by said lever and providing a variable fluid pressure, means for applying said variable fluid pressure to the spring-biased element of the governing mechanism, a fulcrum for the lever, and means for moving said fulcrum transversely of the lever to vary the fluid pressure provided for a given position of said part to which the lever is connected and for simultaneously moving said fulcrum longitudinally of the lever, thereby changing the lever arm ratios to vary the amount of change in the fluid pressure for a given amount of movement of said part.

12. In a speed governor for a prime mover, the combination of means including a member for controlling the admission of motive fluid to the prime mover as a function of the position of said member, means for applying to said member a governing force varying as a function of the speed of the prime mover, means for applying to said member a fluid pressure which varies as a function of the position of said member, and means for varying said fluid pressure for a given position of said member and simultaneously varying the amount of variation in said fluid pressure for a given movement of said member.

13. In a speed governor for a prime mover, the combination of means controlling the admission of motive fluid to the prime mover, said means including a governing member, a fluid pressure relay and a restoring mechanism for the relay, means for applying to said member a governing force varying as a function of the speed of the prime mover, means separate from the first-mentioned means for applying to said member a fluid pressure which varies upon movement of an element of the first-mentioned means, means for varying said fluid pressure for a given position of said element, and means for varying the amount of variation in said fluid pressure for a given movement of said element.

14. In a speed governor for a prime mover, the combination of means including an element and controlling the admission of motive fluid to the prime mover as a function of the position of said element, means for biasing said element by a governing force varying as a function of the speed of the prime mover, a spring biasing said element, the deflection of said spring varying as a function of the governing force applied to said element, and means for biasing said element by a fluid pressure varying as a function of the position of said element to modify the effective scale of said spring.

ANTHONY F. SCHWENDNER.